(12) United States Patent
Ogawa

(10) Patent No.: US 8,195,961 B2
(45) Date of Patent: Jun. 5, 2012

(54) REMOVABLE STORAGE DEVICE AND ASSOCIATED METHODOLOGY OF DATA ENCRYPTION

(76) Inventor: Keiko Ogawa, Tokyo (JP)

( * ) Notice: Subject to any disclaimer, the term of this patent is extended or adjusted under 35 U.S.C. 154(b) by 441 days.

(21) Appl. No.: 12/351,050

(22) Filed: Jan. 9, 2009

(65) Prior Publication Data

US 2009/0249084 A1    Oct. 1, 2009

Related U.S. Application Data

(63) Continuation of application No. 12/123,199, filed on May 19, 2008, now abandoned.

(30) Foreign Application Priority Data

May 17, 2007 (JP) ................. 2007-131979

(51) Int. Cl.
    G06F 11/30 (2006.01)
(52) U.S. Cl. ........................ 713/193
(58) Field of Classification Search ........... 713/193
    See application file for complete search history.

(56) References Cited

U.S. PATENT DOCUMENTS

| 6,370,629 | B1 * | 4/2002 | Hastings et al. ........... 711/163 |
| 7,322,047 | B2 * | 1/2008 | Redlich et al. ............. 726/27 |
| 2006/0204210 | A1 | 9/2006 | Yanase et al. |

FOREIGN PATENT DOCUMENTS

| JP | 2005-275112 | 10/2005 |
| JP | 2006-254244 | 9/2006 |
| JP | 2006-325269 | 11/2006 |
| JP | 2007-11511 | 1/2007 |
| JP | 2007-89158 | 4/2007 |

* cited by examiner

*Primary Examiner* — Kambiz Zand
*Assistant Examiner* — Abiy Getachew
(74) *Attorney, Agent, or Firm* — Oblon, Spivak, McClelland, Maier & Neustadt, L.L.P.

(57) ABSTRACT

A data encryption transmission system and associated methodology is provided including a data input site that compresses and encrypts data based on a shared encryption key and then transmits the compressed and encrypted data to an external network. A database server which is operably linked to the external network and stores, manages, transmits, and receives data. A removable storage stores an identification code, and a client site which is configured to receive the removable storage generates an encryption key based on the identification code, receives encrypted data from the external network, decrypts and expands the received data based on the shared encryption key, encrypts the data based on the encryption key and saves the encrypted data, and finally decrypts the encrypted data and outputs the data using the encryption key.

15 Claims, 8 Drawing Sheets

REMOVABLE STORAGE DEVICE AND ASSOCIATED METHODOLOGY OF DATA ENCRYPTION

CROSS-REFERENCE TO RELATED APPLICATIONS

This application is a continuation and claims the benefit of priority under 35 U.S.C. §120 from U.S. application Ser. No. 12/123,199, filed May 19, 2008 and claims the benefit of priority under 35 U.S.C. §119 of Japanese patent application No. 2007-131979, filed May 17, 2007, the entire contents of which are incorporated herein by reference.

BACKGROUND

The present advancements are directed to encryption methodologies and a portable storage device for storing data thereto, and more particularly to a data preservation system including a removable storage device such as a USB memory drive which may be used, for example, to acquire materials, documents, etc. via an information network such as the Internet and encrypting, transmitting, and preserving the data within the removal storage.

In commercial settings, sales personnel commonly present marketing and product information to potential customers via a personal computing device. Naturally, as the degree of documentation and data increases with inventory, sales volume and the like, the amount of marketing and product information increases proportionately. In this way, a large amount of sensitive data may need to be stored and presented to the portable platform.

Increasingly, up to date information may be acquired remotely, over wireless networks via the Internet. Of course, public networks expose sensitive data to potential data theft, packet sniffing, and hacking with respect to the enterprise web interface. Furthermore, even in tightly managed, remote access, if the remote location is not also closely monitored for security issues, theft and tampering of the data from the downloaded destination can occur.

Accordingly, a removable storage device, configurable for remote deployment is provided to address the deficiencies noted above.

SUMMARY OF EXEMPLARY ASPECTS OF THE ADVANCEMENTS

In one exemplary aspect of the current invention, a data encryption system contains a data input site, a database server, a removable storage, and a client site. The data input site compresses and encrypts data based on a shared encryption key, and transmits the compressed and encrypted data to an external network. The database server is connected to the external network and stores, manages, transmits, and receives the compressed and encrypted data. The removable storage stores an identification code. The client site is adapted to be operably linked with the removable storage and generates an encryption key based on the identification code. The client site then receives the compressed and encrypted data from the external network, decrypts and expands the compressed and encrypted data based on the shared encryption key, encrypts the data based on the encryption key, and saves the encrypted data. The client site decrypts the encrypted data and outputs the data using the encryption key.

In another exemplary aspect of the current invention, a data encryption system contains a database server connected to an external server, a data input site, a removable storage, and a client site. The data input site compresses and encrypts data based on a shared encryption key, and transmits the compressed and encrypted data to the external network. The removable storage stores an identification code. The client site is adapted to be operably linked with the removal storage and generates an encryption key based on the identification code. The client site then receives the compressed and encrypted data from the external network, decrypts and expands the compressed and encrypted data based on the shared encryption key, encrypts the data based on the encryption key, and saves the encrypted data. The client site decrypts the encrypted data and outputs the data using the encryption key.

In still a further exemplary aspect of the current invention, a data encryption system contains a database server connected to an external network, a removable storage, and a client site including a data input site. The database server stores, manages, transmits, and receives data. The removable storage stores an identification code. The client site compresses and encrypts the data based on a shared encryption key, and then sends the compressed and encrypted data to the external network. The client site then generates an encryption key based on the identification code of the removable storage, receives the data from the external network, and decrypts and expands the compressed and encrypted data based on the shared encryption key. Finally the client site encrypts the data based on the encryption key, saves the encrypted data, and decrypts and outputs the encrypted data using the encryption key.

In yet another exemplary aspect of the current invention, a removable storage unit contains a computer readable program in internal memory for implementing a method which accesses a designated database server for obtaining encrypted data saved in the database server, decrypts the encrypted data using a predetermined shared encryption key, re-encrypts and saves decrypted data using an encryption key of the removable storage unit, and decrypts the encrypted data and outputs the decrypted data with the encryption key.

It is to be understood that both the foregoing general description of the invention and the following detailed description are exemplary, but are not restrictive, of the invention.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings, wherein.

DETAILED DESCRIPTION

Figure 1:
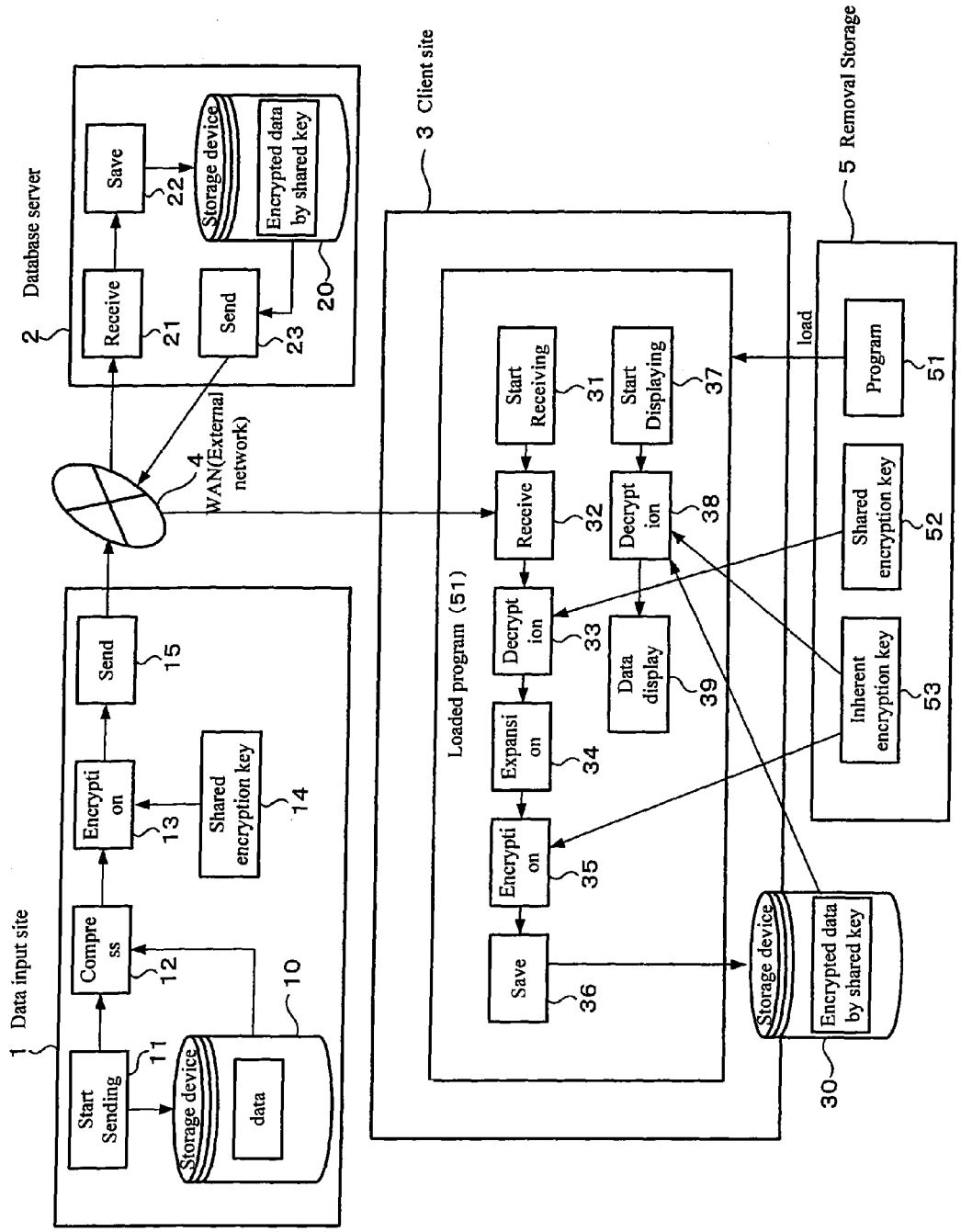
FIG. 1 illustrates a high level block diagram of the data encryption system in accordance with an exemplary embodiment the claimed advancements.

A data encryption system is described herein, an exemplary embodiment employing data encryption, removable storage, and associated methodology to compresses and encrypt data based on a shared encryption key. The compressed an encrypted data is transmitted to an external network in which a database server operably linked to the external network may stores, manage, transmit, and receive the data. A removable storage stores an identification code, and a client site which is configured to receive the removable storage generates an encryption key based on the identification code, receives encrypted data from the external network, decrypts and expands the received data based on the shared encryption key, encrypts the data based on the encryption key and saves the encrypted data, and finally decrypts the encrypted data and outputs the data using the encryption key. In the drawings, the same reference numerals are used for designating the same elements throughout the several figures.

FIG. 1, is a high level block diagram of an information and telecommunication system in accordance with an exemplary embodiment. As shown in FIG. 1 components of the system include a data input site 1, database server 2, and a client site 3 connected via the external network 4. While additional components may be utilized, such as routers, bridges, network switches, enterprise infrastructure, such components are omitted as known to those in the art, the description of which is unnecessary.

The components of FIG. 1 are shown operably linked via an external wide area telecommunication network 4. In an exemplary embodiment, the external wide area (WAN) telecommunication network 4 is the global communications network, commonly referred to as the Internet. The network components communicate via WAN 4 through hyper text transfer protocol (HTTP) in this exemplary embodiment. Of course, other connectionless or connection-oriented systems and protocols are equally embraced by the embodiment described herein.

Those skilled in the art recognize that while an exemplary embodiment is defined as being used with the Internet, the present invention is equally applicable to any local area network (LAN) or other WAN configuration whether land-based or wireless in form. Similarly, the system described herein may be employed in a stand-alone configuration in which the system components are utilized in as a local application.

In addition to the encryption of the embodiments described herein, further technologies may be utilized to enhance security over networks to effectively tunnel data over the network 4 as compressed and encrypted in accordance with the present advancements. For example, in network communications utilizing a conventional TCP/IP (Transmission Control Protocol/Internet Protocol) or UDP (User Datagram Protocol), encryption communication, such as IPsec (Internet Protocol Security) or SSL (Secure Socket Layer), is utilized to prevent some security risks presented during the exchange of data between network terminals. In general, encryption unit 13 would additionally provide either a common key (also called a secret key) cryptograph system, and/or a public key cryptograph system.

Referring again to FIG. 1, The data input site 1 includes a storage device 10, and functional components transmission initiation unit 11, compression unit 12, encryption unit 13, shared encryption key 14, and a transmission unit 15. In the exemplary embodiment, units 11-15 are implemented as a single computer executable instruction set of a data processor of data input site 1, not shown. The specific coding of these functions may be expressed as object oriented modules, cooperating and/or independent daemons, or separate utility applications. In an alternative embodiment, these functions may be expressed via independent hardware implementations such as a FPGS, ASIC, microcontroller or PLD. Additionally, transmission unit 15 may be embodied as a NIC interface, or suitably configured network interface card or wireless transmission unit.

The exemplary data input site 1 of FIG. 1 is a hardware platform of a personal computing device such as a PC employing an Intel Pentium processor. The instruction set of units 11-15, as well those of database server 2 and client site 3 may be provided as a utility application, background daemon, or component of an operating system, or modified TCP/IP stack executing in conjunction with a local processor and operating system such as Microsoft VISTA®, Unix, Solaris, Linux, Apple MAC-OS and other systems known to those skilled in the art. Alternatively, those skilled in the art will recognize the applicability to mobile devices such as PDAs, phones, and portable entertainment devices which employ Symbian, Microsoft Mobile® and other mobile operating systems.

Memory required for supporting the registries, kernel and like features of the data input site 1 of FIG. 1 is omitted as well known. Likewise the description of general features of the data input site 1 such as local volatile and/or non-volatile memory, I/O capabilities, common peripheral devices, as well as corresponding functionality have been omitted for brevity, the detailed operation/description of which is well known to those skilled in the art. The specific coding and porting of the algorithms described herein is within the ability of one skilled in the art upon review of this specification and drawings.

The storage device 10 of data input site 1 is designated for storing and transmitting the data. If a start instruction is issued by the transmission initiation until 11, the compression unit 12 will compress the data stored on the storage device 10 in accordance with a compression algorithm as detailed below. Compressed data are supplied to the encryption unit 13 and encrypted using a shared encryption key 14. In addition, data encrypted by the shared encryption key 14 (hereafter referred to as shared key encrypted data) is transmitted to the network 4 via a transmission unit 15.

A database server 2 houses a receiving unit 21, a storage device 22, and a sending unit 23. All the shared key encrypted data received from the network 4 is stored on a storage device 20 in an encrypted state. In the exemplary embodiment, units 21-23 are implemented as a single computer executable instruction set of a data processor of database server (2) not shown. The specific coding of these functions may be expressed as object oriented modules, cooperating and/or independent daemons, or separate utility applications. In an alternative embodiment, these functions may be expressed via independent hardware implementations such as a FPGS, ASIC, microcontroller or PLD. Additionally, transmission unit 15 may be embodied as web front end, NIC interface, or suitably configured network interface card or wireless transmission unit.

As recognized by one of skill in the art, the database server 2 of FIG. 1 may embrace a hierarchical model, network model, relational model, or other database model. A web front end may be provided to present a graphical user interface (GUI) for accessing the database server 2 from a remote location. The database server 2 components may employ a windows based operating system, however alternative operating systems may include but are not limited to Unix, Solaris, Linux, as well as Apple MAC-OS. Specific implementation of this database server 2 may embrace a database management system such as Oracle, Microsoft SQL Server, MySQL, Microsoft Access, Nomad, and the like.

The encrypted data stored on the storage device 20 is transmitted to the network 4 via a sending unit 23 when a request is received from the client site 3. Consequently, data transmitted from the sending unit 23 also serves as the shared key encrypted data enciphered with the shared encryption key 14.

The client site, generally designated 3 includes a storage device 30, client starting unit 31, receiver unit 32, decryption unit 33, decompression (expansion) unit 34, and an encryption unit 35. Likewise, save unit 36 is shown for writing data to storage device 30 and display units 37-39 provide the necessary functionality for rendering decoded data to a display of client site 3, not shown. In the exemplary embodiment, units 31-39 are implemented as a single computer executable instruction set 51. The specific coding of these functions may be expressed as object oriented modules, cooperating and/or independent daemons, separate utility applications. In an alternative embodiment, these functions may be expressed as independent hardware implementations such as a FPGS, ASIC, microcontroller or PLD. Additionally, transmission unit 15 may be embodied as a NIC interface, or suitably configured network interface card or wireless transmission unit.

In the exemplary embodiment, a removable storage 5 is utilized in conjunction with client site 3. Similarly, at the client site 3, there exists an interface for receiving the removable storage 5, physically, or via wireless communication. If the removable storage 5 is physically coupled to the client site 3, the program 51 is loaded to the client site 3 from a memory of the removable storage, designated 51. The program 51 provides the functionality of units 31-39 noted above.

The removable storage 5 described herein may be embodied as a USB memory device, flash drive, zip disk, floppy disk, compact disc, miniSD, or even DVD RAM. The interface regarding the removable storage 5 may be a universal serial bus (USB) connector, a firewire IEEE 1394 connector, WiFi, WiMax, WiLAN or an Ethernet connector. A plurality of removable storage 5 devices may also be used, wherein each removable storage 5 contains the same program (or encryption key). This would allow for encrypted data to be shared by members of a common group.

In the exemplary embodiment, if a start instruction is issued by the client starting unit 31 at the client site 3, the shared key encrypted data will be received by the receive unit 32 from the database server 2 via network 4. This received shared key encrypted data will be decrypted using the shared encryption key 52 which was supplied to decryption unit 33 and beforehand stored on the removable storage 5. This decrypted data is then expanded by a decompression (expansion) unit 34 to convert the data back to the original format.

Data that was expanded by the decompression unit 34 is re-encrypted by the encryption unit 35, using an inherent encryption key 53 that was stored on the removable storage 5. This inherent encryption key 53 is generated from an inherent identification code that was assigned during manufacturing and stored on the internal memory device of the removable storage 5. Then, data encrypted using this inherent encryption key 53 (hereinafter referred to as inherent key encrypted data) is stored on the storage device 30 via a saving unit 36.

After the program 51 has been loaded to the client site 3, if a start instruction is issued by the display start unit 37, the decryption unit 38 will decrypt the inherent key encrypted data stored on the storage device 30, using the inherent encryption key 53 stored on the removable storage 5. Then, the decrypted data are supplied to the display unit 39. As a result, the data which are stored in the database server 2 after receiving the data from the data input site 1 via the network 4 will be displayed on the client site 3.

The decompression unit 34 can be performed before or after encryption. Data decrypted by the decryption unit 33 are encrypted with the inherent encryption key 53 in a compressed state and stored on the storage device 30. In order to display this encrypted data, the data will be decrypted by the decryption unit 38 with the inherent encryption key 53, then expanded with the decompression unit 34 and displayed by the data display 39.

Processing operations of the exemplary information and telecommunication system applied to the data encryption system and removable media of an exemplary embodiment is provided relative to the flow charts in FIGS. 2 to 4 detailed below.

Any processes descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in revere order, depending upon the functionality involved, as would be understood by those skilled in the art.

Figure 2:
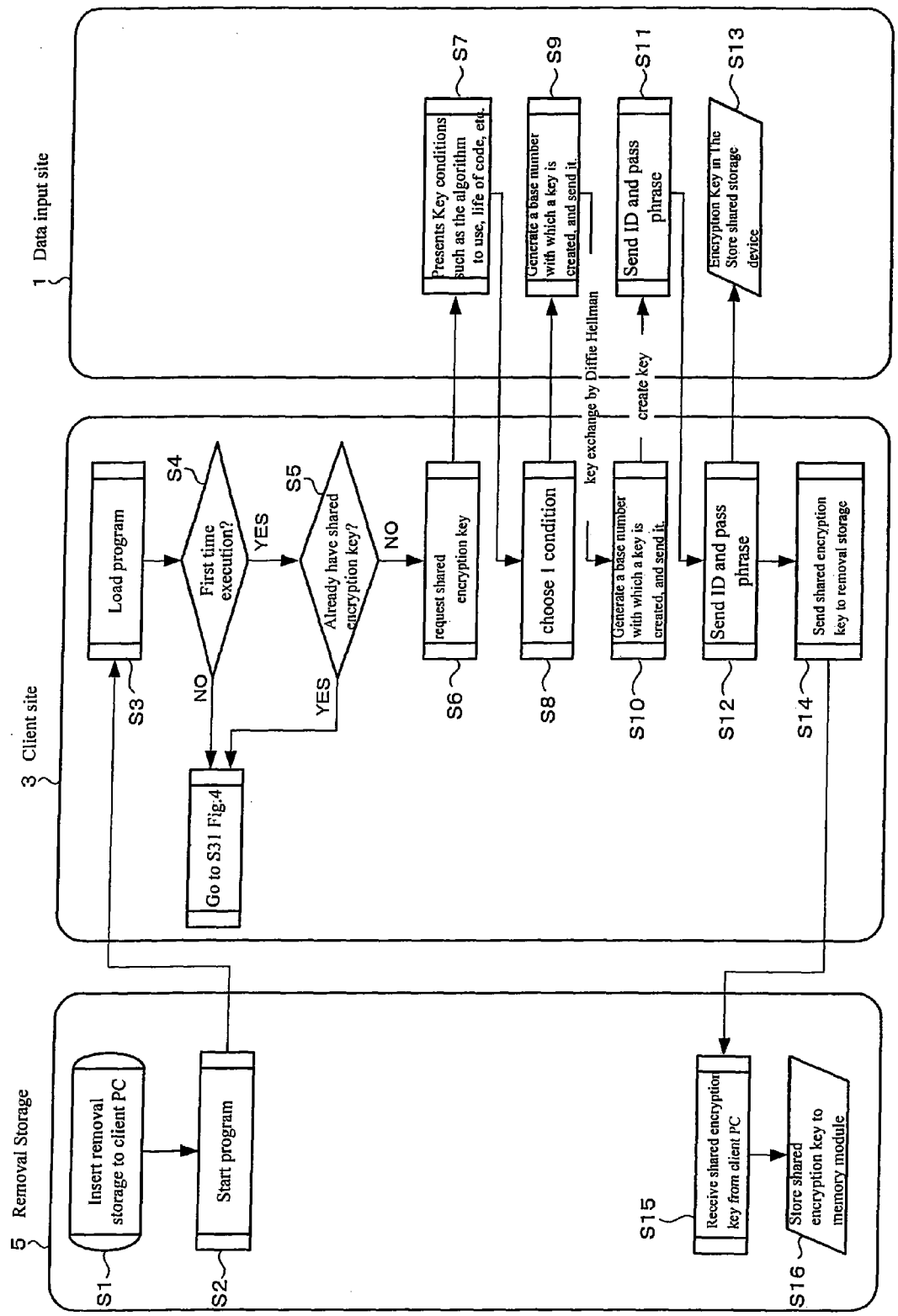
FIG. 2 is a flow chart of an exemplary encryption methodology utilizing the system of FIG. 1 in accordance with an exemplary embodiment the claimed advancements.
Figure 3:
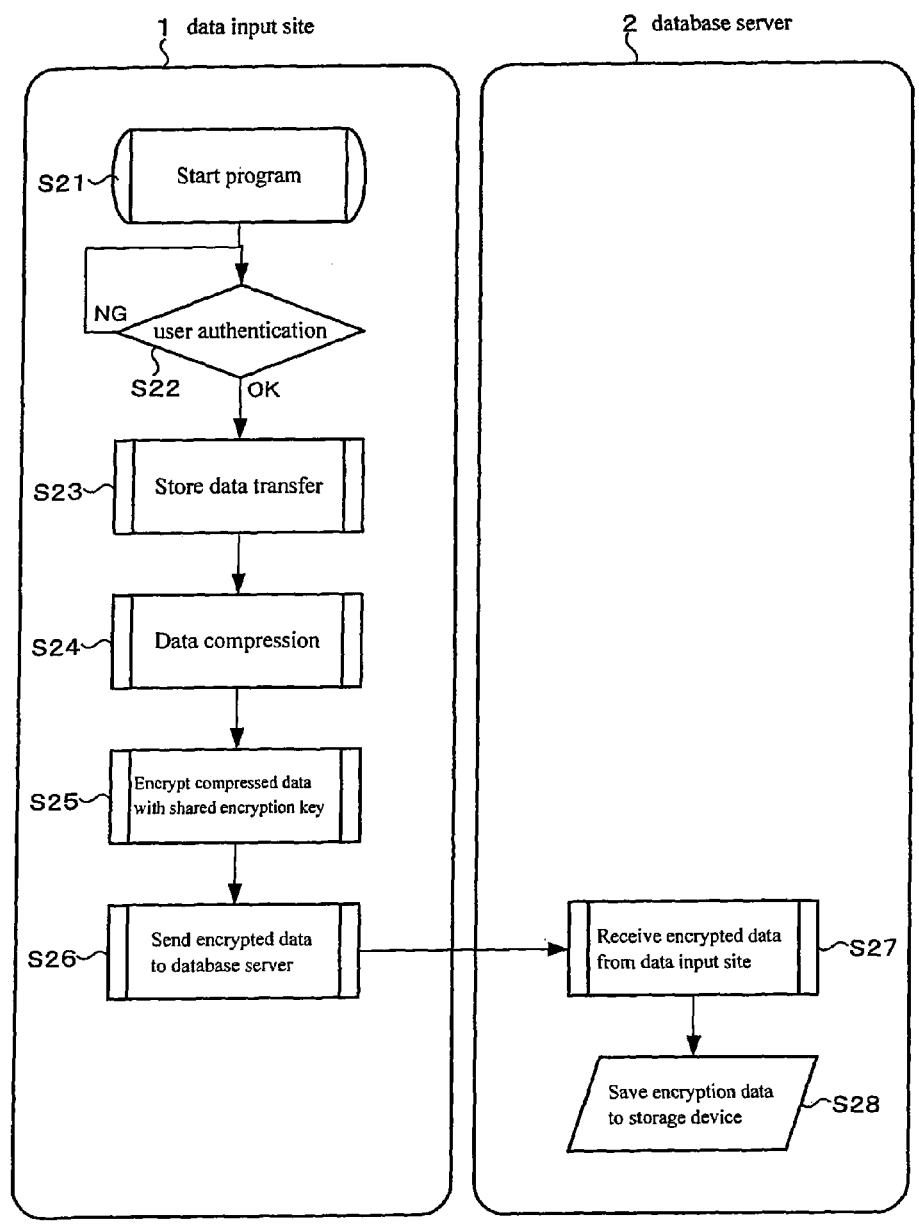
FIG. 3 is a flow chart illustrating an exemplary encryption methodology compartmentalizing processes of the data input site and processes of the database server.

The flow chart in FIG. 2 shows the procedure of the processing operations that distribute the shared encryption keys. FIG. 2 shows the removable storage 5 on the left, the client site 3 in the center, and the data input site 1 on the right.

First, if the removable storage 5 is operably linked to the client site 3 (physically or wirelessly) in step S1, the program 51 will start step S2, and the program 51 will be loaded into the client site 3 in step S3. At the client site 3, it will be determined if this is the first time program 51 is executed, in step S4. If this is not the first time (NO), the process will move on to step 31 (FIG. 4), for receiving data.

If this is the first time execution of the program, (YES) in step S4, the next step S5 determines whether or not a shared encryption key exists on the removable storage 5. This operation is directed to a shared encryption key being originally stored on the removable storage 5. Alternatively, the user may enter and store the shared encryption key after obtaining it separately by post mail commerce, or the like. Consequently, if the shared encryption key already exists on the removable storage 5 (YES), the process moves on to the step 31 describing the operating procedure for receiving data shown in FIG. 4 below.

In step S5, if the shared encryption key does not exist in the removable storage 5 (NO), then a request for the shared encryption key will be transmitted to the data input site 1 in step S6. The data input site 1 may allow the client site 3 to choose the algorithms to apply and the validity time or lifespan of the key in step S7. The client site 3 will provide a selection of one of these options in step S8 via a touch screen, keyboard voice, tactile or like interface. Then, the data input site 1 produces and transmits a number that will be used to generate the key in step S9, and the client site 3 will produce and transmit a number that will be used to generate the key in step S10. This leads to a key exchange in accordance with Diffie-Hellman protocol.

The key generated in step S10 will be transmitted to the data input site 1, so the data input site 1 will transmit the necessary ID and passwords in step S11. Similarly, the client site 3 will transmit the necessary ID and passwords in step S12, after which the data input site 1 will save the encryption key on the storage device in step S13. Furthermore, the client site 3 will send the encryption key to the removable storage 5 in step S14. When the removable storage 5 receives the encryption key from the client site 3 in step S15, it stores the encryption key into the memory device in the removable storage in step S16.

By using the key exchange algorithm above, the distribution of keys is carried out between the data input site 1 and the client site 3. The flow chart in FIG. 3 shows processing operations to transmit data from the data input site 1 to the database server 2. FIG. 3 shows the data input site 1 on the left and the database server 2 on the right.

When the program is executed in step S21, user authentication is performed at the data input site 1. If authentication is not confirmed (NO), step S22 will be repeated. If authentication is confirmed (OK), the instruction for starting the data transmission will be issued in step S23. Then the data is compressed in step S24 and the compressed data is encrypted with the shared encryption key in step S25.

Data encrypted in step S25 is transmitted to the database server 2 in step S26. The database server 2 receives the encrypted data which was encrypted using the shared encryption key from the data input site 1 in step S27. The shared key encrypted data is stored on the storage device in step S28. By this procedure, the shared key encrypted data is transmitted from the data input site 1 to the database server 2.

Figure 4:
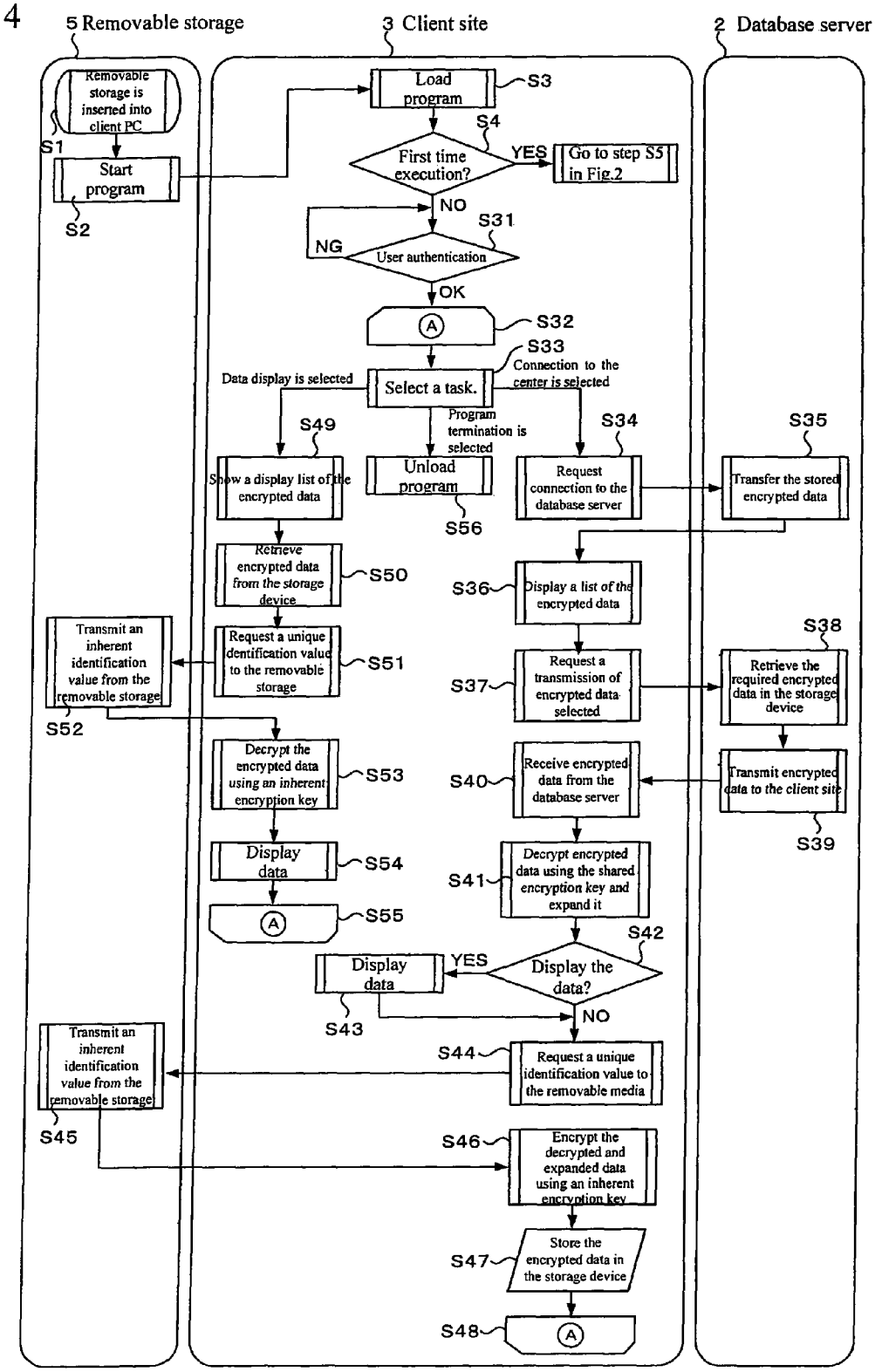
FIG. 4 is a flow chart illustrating an exemplary encryption methodology compartmentalizing processes of the removable storage, processes of the client site, and processes of the database server.

The flow chart in FIG. 4 shows processing operations to move data from the database server 2 to the client site 3. FIG. 4 shows the removable storage 5 on the left, the client site 3 in the center, and the database server 2 on the right.

Initially, if the removable storage 5 is operably linked to the client site 3 at step S1, the program 51 will begin step S2, and the program 51 will be loaded into the client site 3 in step S3. At the client site 3, it will be determined if this is the first time execution of the program in step S4. The above description is for the same operating procedure and steps S1-S4 as given for FIG. 2.

If this is the first time execution of the program in step S4 (YES), the process continues to step S5 in FIG. 2 by displaying the operating procedure for exchanging shared encryption keys. Meanwhile, if it is not the first time (NO) in step S4, the user authentication procedure will be performed in step S31. If authentication is not confirmed (NO), step S3 will be repeated. If authentication is confirmed (OK), the process will move to the starting point for repeating the process at step S32.

Next, the desired operation is selected at the client site 3 in step S33. Here, the connection to the center is selected. The client site 3 will request a connection to the database server 2 in step S34. If a connection request is received, the database server 2 transfers a list of the shared key encrypted data stored in the storage device 20 in step S35. The client site 3 displays the list of encrypted data in step S36, and requests transmission of the encrypted data in step S37.

Then, the database server 2 retrieves the encrypted data from the storage device in step S38, and transmits it to the client site 3 in step S39. The client site 3 receives the shared key encrypted data from the database server 2 in step S40, and decrypts and compresses the received data using the shared encryption key in step S41. Furthermore, the client site 3 determines whether or not the data should be displayed in step S42, and displays the data in step S43 when display is selected (YES). When no display is selected (NO) in step S42, and after displaying the data in step S43, the client site 3 requests an identification code 300 for the removable storage 5 in step S44. In response to the request, the removable storage 5 transmits an identification code 300 in step S45.

In the client site 3, the shared key encrypted data are decrypted and compressed in step S41, and the decrypted data are re-encrypted with the inherent encryption key in step S46, and stored on the storage device in step S47. This is the process by which the system stores and displays the shared key encrypted data received from the database server 2. After the data is stored this way, the operation will return to step S32 via step S48.

If a data display is selected in step S33, the program will display a list of the inherent key encrypted data stored on the storage device in step S49 after retrieving the encrypted data from the storage device in step S50. In response, the removable storage 5 transmits an identification code 300 in step S52. The client site 3 decrypts the inherent key encrypted data retrieved from the storage device 30 using the inherent encryption key received from the removable storage 5 in step S53. This is the process by which the data stored on the storage device is displayed. After retrieving and displaying the data, the operation will return to step S32 via step S55.

If program is ended in step S33, the program will be unloaded in step S56. Thus, data entered at the data input site 1 and stored in the database server 2 can be displayed on the client site 3. And, according to the exemplary embodiment, because the data stored in the database server 2 is encrypted with the shared encryption key, it is very difficult to falsify the data. Therefore, even if the data are stolen, there are very few possibilities that the data may be decoded and abused without the encryption key.

Furthermore, because the downloaded data is saved after being encrypted with an inherent encryption key, unless there is a corresponding removable storage 5 which holds the inherent encryption key, there is no way to decrypt the saved data. Therefore, if a laptop with downloaded data is stolen, and if the removable storage 5 is secured separately the data of the laptop remains secure.

For example, if sales personnel carry only the removal storage and procure a PC at the customer destination, the data downloaded to the PC hard disc can be encrypted with an inherent encryption key. In this situation, there is no way of decrypting the data unless there is a corresponding removable storage 5.

Figure 5:
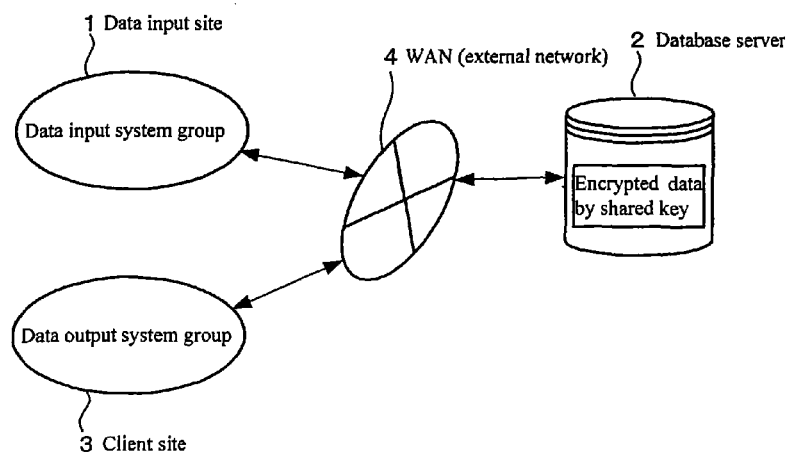
FIG. 5 is a data flow diagram of communication relationships in an encryption system in accordance with an exemplary embodiment the claimed advancements.

FIG. 5 shows an overview of the architecture in accordance with the exemplary embodiment. That is, in FIG. 5, the data input system group is provided as data input site 1 and the data output system group as the client site 3. Between these two groups, data are transmitted and saved through the database server 2 and the external network 4. As shown, this exemplary data encryption system transmits and saves data between data the input system group and the data output system groups.

Figure 6:
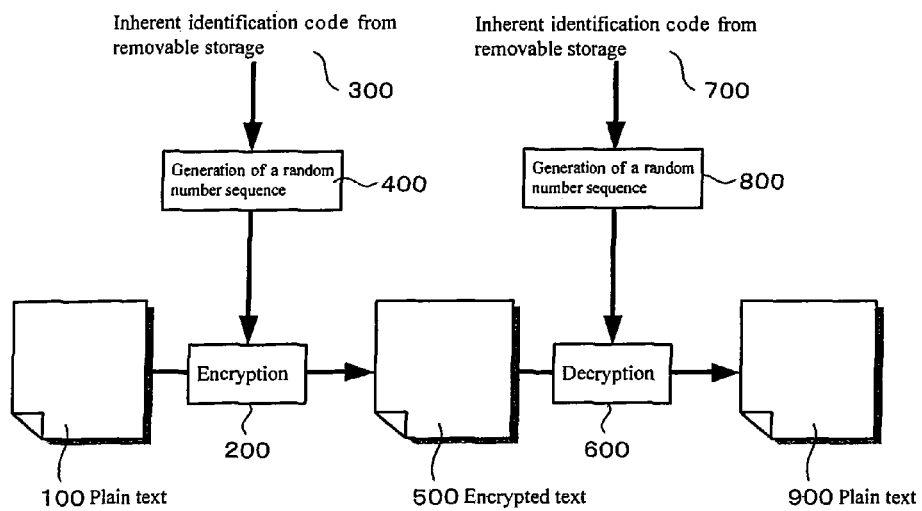
FIG. 6 is a data flow diagram of an identification code encryption system in accordance with an exemplary embodiment the claimed advancements.

FIG. 6 shows an alternative exemplary method of encrypting and decrypting data using an inherent identification code of the removal storage. As seen in FIG. 6, a plain text 100 is supplied to an encryption unit 200. Inherent code 300 of the removal storage is supplied to a random number generator unit 400 and the generated random number is supplied to an encryption unit 200 to produce a cryptogram 500.

The cryptogram 500 is supplied to a decryption unit 600. The inherent number 700 of the removal storage is supplied to a random number generator unit 800 and the random number is supplied to a decryption unit 600 and plain text 900 is produced. At this point, if an inherent identification code 300 and 700 of the removal storage and random number generator unit 400 and 800 is the same, then the decrypted plain text 900 is identical to the plain text 100. Of course, the method shown on FIG. 6 is exemplary only and variations in ordering, inputs and the like are embraced by the present disclosure.

Figure 7:
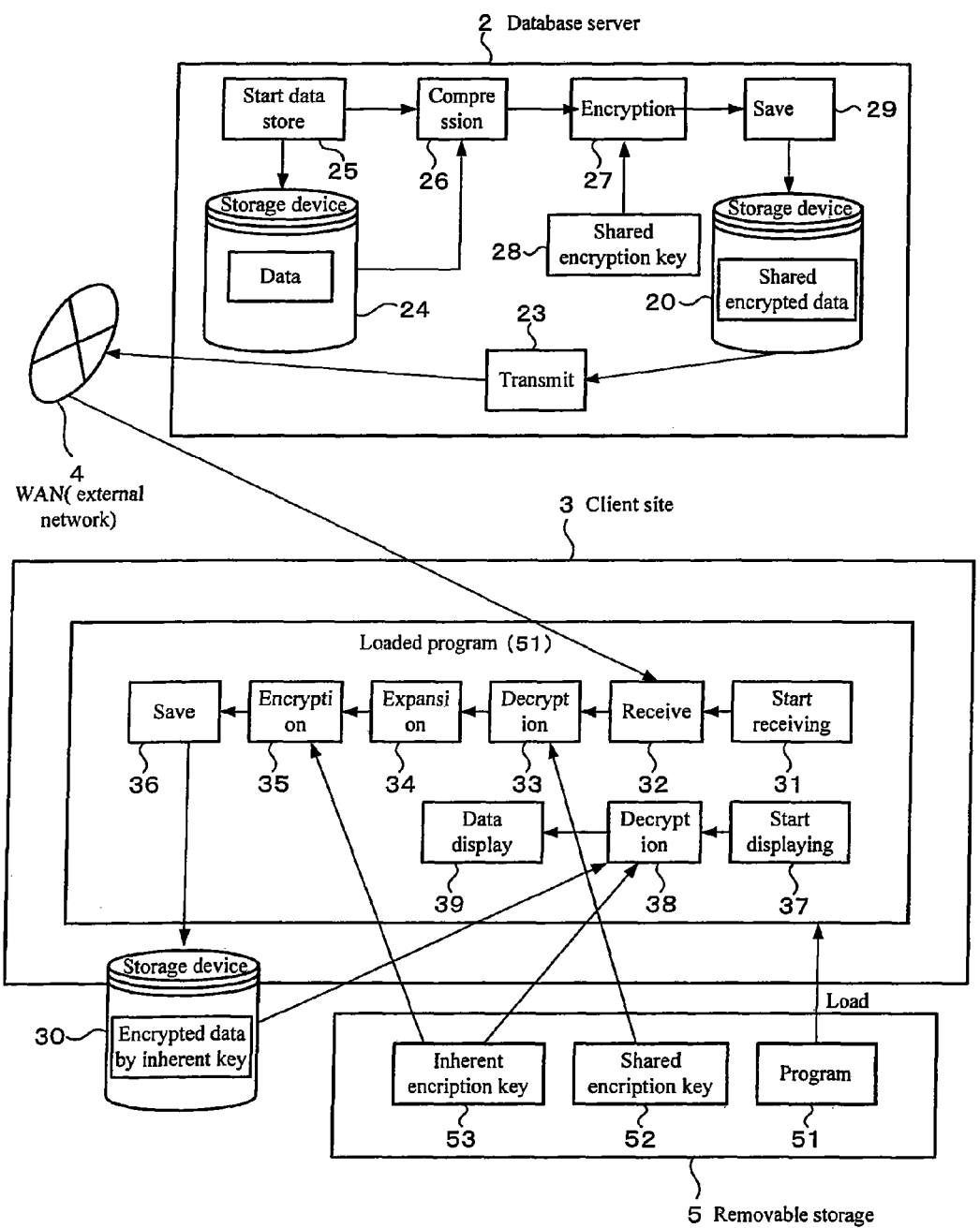
FIG. 7 is a high level block diagram of an exemplary encryption methodology where the encryption takes place on the database serve in accordance with an exemplary embodiment the claimed advancements.
Figure 8:
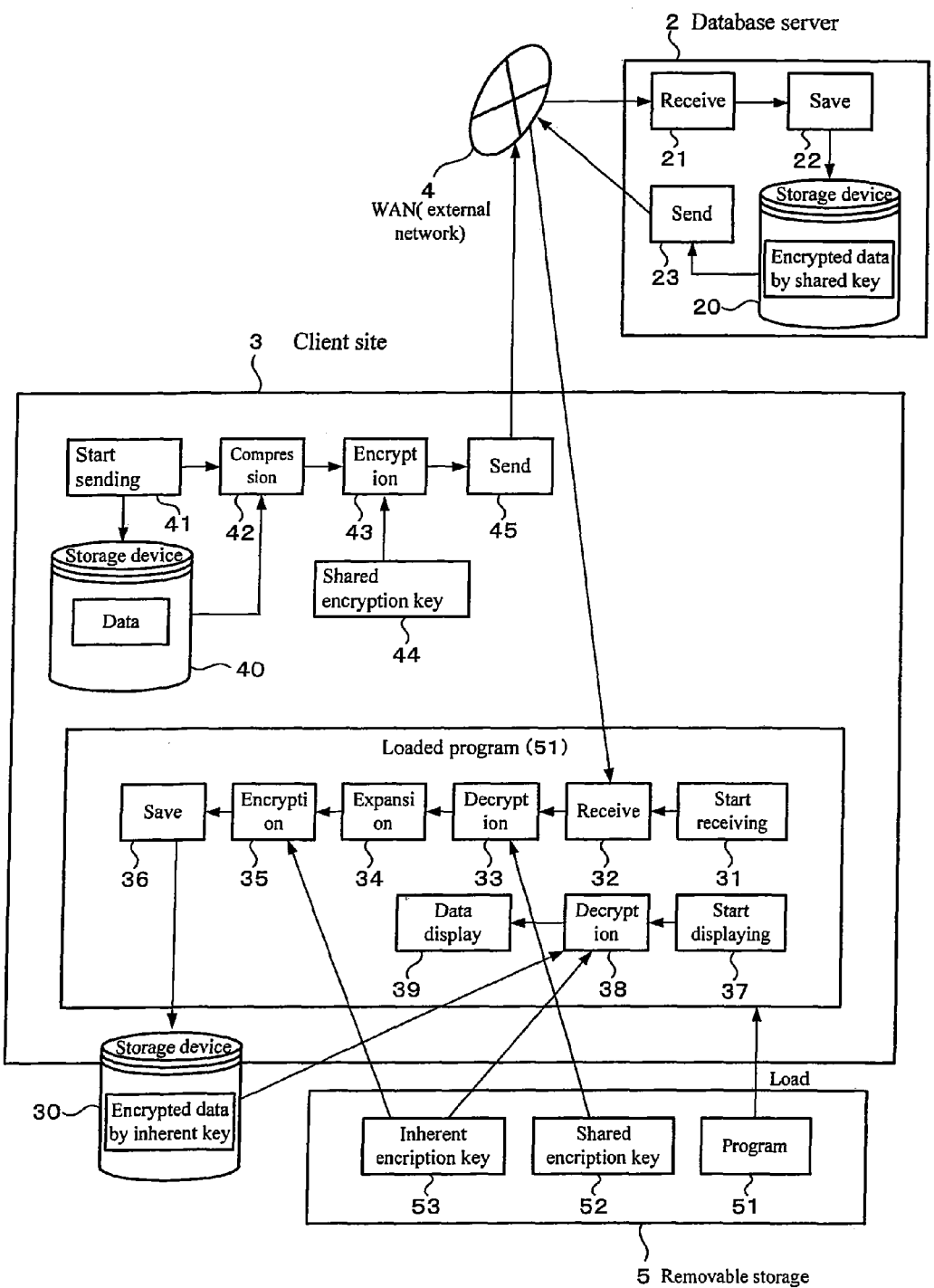
FIG. 8 illustrates an exemplary block diagram of a further embodiment where the client site contains the data input site, in accordance with an exemplary embodiment the claimed advancements.
Figure 9:
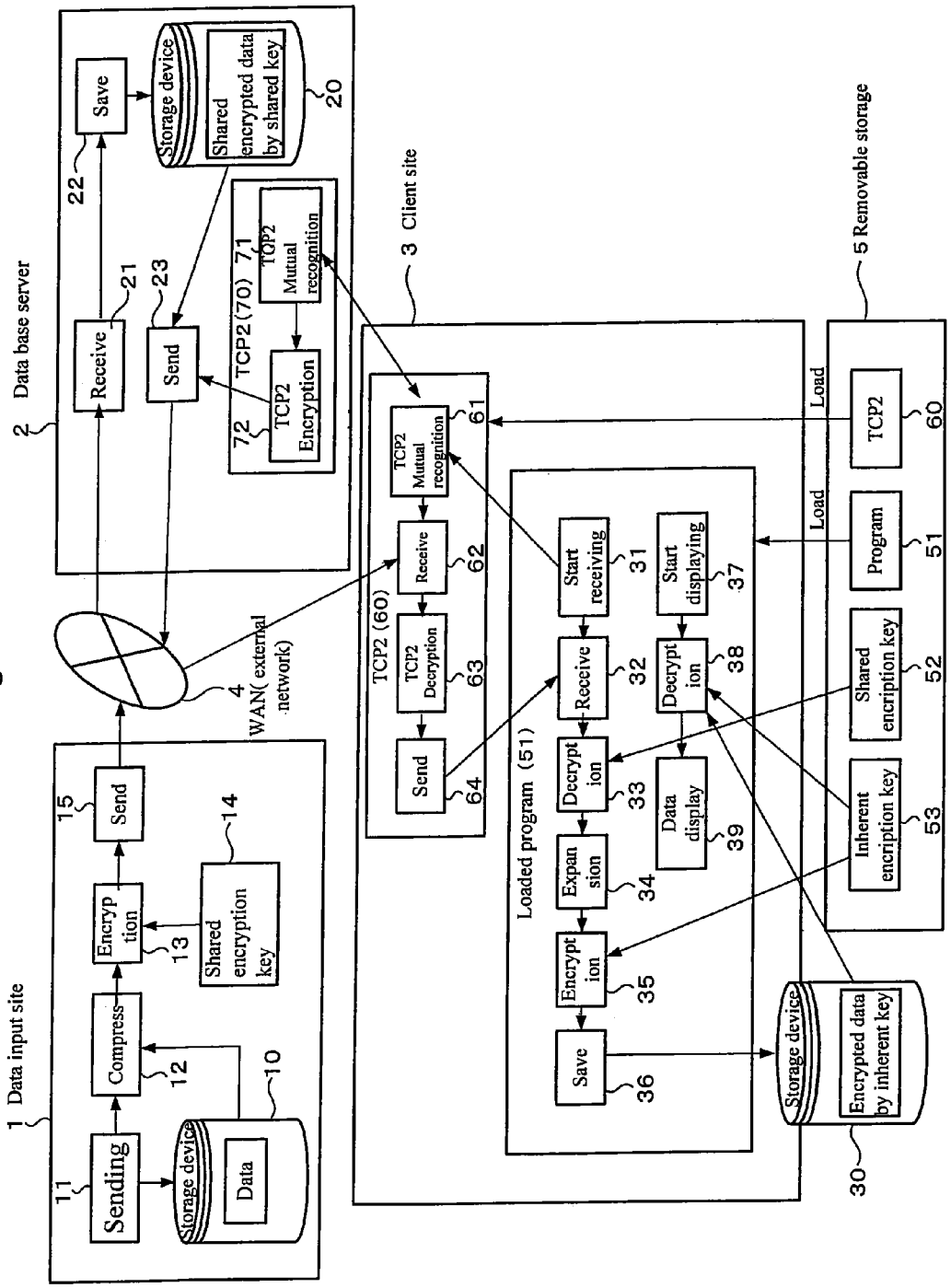
FIG. 9 illustrates an exemplary block diagram of a further embodiment utilizing TCP2 in accordance with an exemplary embodiment the claimed invention.

FIGS. 7-9 show the exemplary embodiments alternative embodiments of the data encryption system. FIG. 7 shows the block configuration of an exemplary system in which the database server 2 is integrated with the function of a data input site 1 and the database server 2 and the client site 3 are connected through the external network 4.

Data are stored on the storage device 24 and the data is saved on the database server 2. When a start instruction is sent from the saving start unit 25, the compression unit 26 will compress the saved data in the storage device 24. The compressed data is supplied to the encryption unit 27 and encrypted by the shared encryption key 28. Furthermore, the share key encrypted data are saved in the storage device 20 through the saving unit 29. After the encrypted data are stored in the storage device 20, the original data stored in the storage device 24 can be erased.

Data encrypted by the shared encryption key saved in the storage device 20 is sent to the network 4 through a sending unit 23 which is requested from client site 3. Then, the same action is taken as the system shows in FIG. 1. With this present embodiment, the data encryption system shown in FIG. 7 can also manage, store and transmit data with high security and safety through an information network such as the Internet.

FIG. 8 shows the block configuration of an exemplary embodiment in which the functionality of client site 3 is integrated with the functions of the data input site 1. In FIG. 8, the database server 2 and the client site 3 are connected through the external network 4. Here, the storage device 40 in which data are stored as well as the data itself are stored on the client site 3. When a start instruction is sent from the saving start unit 41, the compression unit 42 compresses the data saved in the storage device 40. The compressed data are supplied to the encryption unit 43 and are encrypted with the shared encryption key 44. The encrypted data are then sent to the database server 2 through a sending unit 45.

Therefore, with this exemplary system, data saved in the storage device 40 at the client site 3 are encrypted with a shared encryption key and saved in the database server 2. Other functions may provide for the same as the system shown in FIG. 1. The data encryption system shown on FIG. 8 can also manage, store and transmit data with high security and safety through an information network such as the Internet.

The present data encryption system additionally provides for a data input system group and a data output system group as shown in FIG. 5. Although the example configuration in FIG. 8 only shows a single client site 3, this site is representative of a plurality of client sites and the data saved in the storage device 40 can be provided to additional client sites 3 not shown.

In a further embodiment, transport layer security features may be implemented, such as those of "TCP2" a full description of which is found in co-pending U.S. patent application Ser. No. 11/349,142, filed on Feb. 8, 2006, the contents of which are incorporated herein, by reference, in their entirety.

FIG. 9 shows an alternative embodiment applying the encryption communication system of TCP2. Moreover, in the configuration shown in FIG. 9, the parts other than TCP2 are the same as the configuration shown in FIG. 1 with the same symbols, as such, the detailed explanation is omitted.

As shown in FIG. 9, the program 60 of TCP2 and the program 51 are installed in the removal storage 5. When this removal storage 5 is inserted to client site 3, the program 60 of TCP2 is loaded into the client site 3 along with the program 51. When a start instruction is sent from the receiving start unit 31 in program 51, with the mutual recognition unit 61 of the program 60 of TCP2, mutual recognition is made with the mutual recognition unit 71 supplied in the program 70 of TCP2 of the database server 2.

When the mutual recognition has completed, encryption is completed during the sending process of the sending unit 23 by the encryption unit 72 of TCP2, in the program 70 of TCP2 in the database server 2. The data encrypted by TCP2 is then sent to the client site 3 through the network 4.

Furthermore, at the client site 3, when mutual recognition takes place in the mutual recognition unit 61, receiving takes place at the receiving unit 62 in the program 60 of TCP2. Then, the received data are decrypted with the decryption unit 63 in TCP2 and are supplied in the sending unit 64 and are sent to the receiving unit 32 of the program 51. The other processes are completed similarly as shown in the system of FIG. 1.

Likewise, the data encryption system shown in FIG. 9 can also manage, store and transmit data with high security and safety through an information network such as the Internet. Also, in the system shown in FIG. 9, encryption communication using TCP2 which has a function with high security is further added. Even when compared with the file-sharing communication by existing encryption processing, the communications system which is exhibited is a very powerful defense function to the disclosure, alteration, spoofing, penetration, and attacks of data.

A plurality of removable storage devices 5 may be used that contain different unique encryption keys. In this example, when a member of a certain group needs to decrypt the encrypted data shared by the group, he must borrow a removable storage device before taking it out. The group member may also review and edit the data by decrypting the encrypted data using the removable storage device. Furthermore, various users may use unique removable storage 5 devices to share data among selective groups. Removable storage 5 may also store log information of encrypting and decrypting actions may also be useful. This log information may include the identification of a PC with which a removable storage 5 has been inserted, the starting and ending time of the encryption or decryption, and the name of the encrypted or decrypted file. Additionally, the removable storage 5 may issue a warning sound if once-decrypted data is to be stored without being re-encrypted at the end of the process.

Additionally, it is possible that data encrypted with a particular PC and a particular removable storage 5 may only be decrypted only with the same PC and same removable storage. This will allow verification of a PC that is known to be secure, regardless of whether or not the same removable storage 5 is employed.

Likewise, a pair of removable storage 5 devices may be required for encryption or decryption of the data. One of the pair of removable storage 5 devices may be used for the actual storage of the data, and the other removable storage may be used for the encryption and decryption processing. In this case, the highly confidential data is encrypted and stored, and the encrypted data can only be decrypted when the same pair of removable storage 5 devices are present. Therefore a high security level is achieved.

A further function of the removable storage 5 may only allow for the viewing of the data, but not allow for decryption of the data. When the removal storage 5 function begins execution, automatic decryption or encryption of the data may provide use for the current invention. Accordingly, automatic encryption and storage of data when the function ends allows a user to forego instruction of decryption or encryption each time the data in such removal storage 5 is used.

Each removable storage 5 may be identified by a unique name, such that when the function of the removable storage 5 begins, the name of the removable storage 5 is displayed. One of skill in the art will also recognize that a PC may be designated as a watched folder by using a removable storage 5. In this case, either an encryption or decryption function may be designated to be associated with the watched folder. Then, when a data file is moved or copied into the watched folder, the data will automatically be encrypted or decrypted, depending on the pre-designated function.

A removable storage 5 may be installed with both a common key, common to a group, and an individual key, unique to the removable storage 5. The common key is used to encrypt the PC owner's personal confidential data. It is therefore possible to share data with the group member each having a removable storage 5 installed with the common key, and simultaneously to secure the confidentiality of the PC user's personal data.

Thus, the foregoing discussion discloses and describes merely exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

The invention claimed is:

1. A data encryption system, comprising:
a data input site configured to compress and encrypt data using a shared encryption key and to transmit the compressed and encrypted data to an external network;
a database server connected to the external network and configured to store, manage, transmit, and receive the compressed and encrypted data;
a removable storage configured to store an identification code; and
a client site configured to be operably linked with the removable storage, upon being linked to the removable storage, the client site being further configured to
generate a local encryption key based on the identification code, the local encryption key being different from the shared encryption key,
receive the compressed and encrypted data from the database server via the external network,
decrypt and decompress the compressed and encrypted data using based-en the shared encryption key,
re-encrypt the data using the local encryption key,
save the re-encrypted encrypted data,
decrypt the re-encrypted encrypted data using the local encryption key, when the data is to be displayed at the client site, and
output the data decrypted using the local encryption key to a display device of the client site.

2. A data encryption system, comprising:
a database server connected to an external network;
a data input site configured to
compress and encrypt data using a shared encryption key,
transmit the compressed and encrypted data to the external network, and
store, manage, transmit, and receive the compressed and encrypted data;
a removable storage configured to store an identification code; and
a client site configured to be operably linked to the removable storage and upon being linked to the removable storage, being further configured to
generate a local encryption key based on the identification code, the local encryption key being different from the shared encryption key,
receive the compressed and encrypted data from the external network,
decrypt and expand the compressed and encrypted data using the shared encryption key,
re-encrypt the data based on the local encryption key,
save the re-encrypted data,
decrypt the re-encrypted data using the local encryption key when the re-encrypted data is to be displayed at the client site, and
output the data decrypted using the local encryption key to a display device of the client site.

3. A data encryption system, comprising:
a database server connected to an external network and configured to store, manage, transmit, and receive data;
a removable storage configured to store an identification code; and
a client site configured to
compress and encrypt data using a shared encryption key,
send the compressed and encrypted data to the database server via the external network,
generate a local encryption key using the identification code of the removable storage when the client site is operably connected to the removable storage,
receive the compressed and encrypted data from the external network,
decrypt and decompress the compressed and encrypted data using the shared encryption key,
re-encrypt the data using based-en the local encryption key,
save the re-encrypted encrypted data, and
decrypt and output the data re-encrypted with the encryption key.

4. The data encryption system according to claim 1, wherein the data input site is further configured to distribute the shared encryption key to the removable storage through the external network using a key exchange algorithm.

5. The data encryption system according to claim 1, wherein the removable storage is further configured to store the shared encryption key and the local encryption key, and the database server is further configured to allow access to the compressed and encrypted data based on receipt of the shared encryption key.

6. The data encryption system according to claim 1, further comprising:
a communications interface configured to facilitate communication between the database server and the data input site and between the database server and the client site using an encryption function of a transport layer.

7. A removable storage unit configured to store computer-readable instructions, the computer-readable instructions when executed by a computer cause the computer to execute a method, comprising:

accessing a designated database server to obtain encrypted data saved in the database server;

decrypting the encrypted data using a predetermined shared encryption key;

re-encrypting and saving the decrypted data using a local encryption key stored in the removable storage unit, the local encryption key being different from the predetermined shared encryption key; and decrypting and outputting the encrypted data using the local encryption key.

8. The removable storage unit according to claim 7, further configured to save the predetermined shared encryption key in internal memory.

9. The removable storage unit according to claim 7, further configured to segment an area of internal memory to save the data encrypted with the local encryption key.

10. The removable storage unit according to claim 7, further configured to store the local encryption key generated based on the identification code in internal memory, the internal memory being authorized at the time of manufacture.

11. The removal storage unit according to claim 7, further configured to execute encrypted communication to access the database server using an encryption function of a transport layer.

12. The data encryption system according to claim 1, wherein the shared encryption key is stored in the removable storage and provided to the client site upon operable linkage with the removable storage.

13. The data encryption system according to claim 1, wherein the client site is further configured to determine whether the shared encryption key is stored in the removable storage, the client site requesting the shared encryption key from the database server when the shared encryption key is not stored in the removable storage.

14. The data encryption system according to claim 1, wherein the removable storage is operatively linked to the client site via a wireless connection.

15. The data encryption system according to claim 12, wherein the shared encryption key and the local encryption key are unloaded from the client site when the removable storage is disconnected.

* * * * *